(12) United States Patent
Aliani et al.

(10) Patent No.: US 7,756,524 B1
(45) Date of Patent: *Jul. 13, 2010

(54) SYSTEM AND METHOD FOR PARTIALLY COUNT-BASED ALLOCATION OF VOCODER RESOURCES

(75) Inventors: Maqbool Aliani, Fairfax, VA (US); Ismael Garcia, Leesburg, VA (US); Ante Kovacevic, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 1050 days.

This patent is subject to a terminal disclaimer.

(21) Appl. No.: 11/345,148

(22) Filed: Jan. 31, 2006

(51) Int. Cl.
*H04W 72/00* (2009.01)
*H04M 7/00* (2006.01)

(52) U.S. Cl. .................. 455/453; 455/452.1; 455/452.2; 370/321; 370/356; 379/219; 379/221.05; 379/221.07

(58) Field of Classification Search ............... 455/453, 455/522, 436, 442, 62, 343, 445, 560; 375/222; 370/336, 311; 379/221.05, 221.07
See application file for complete search history.

(56) References Cited

U.S. PATENT DOCUMENTS

| | | | |
|---|---|---|---|
| 3,773,919 A | 11/1973 | Boswell et al. | 424/19 |
| 4,767,628 A | 8/1988 | Hutchinson | 424/426 |
| 5,164,188 A | 11/1992 | Wong | 424/428 |
| 5,443,505 A | 8/1995 | Wong et al. | 623/4 |
| 5,632,984 A | 5/1997 | Wong et al. | 424/85.4 |
| 5,649,299 A * | 7/1997 | Battin et al. | 455/62 |
| 5,766,242 A | 6/1998 | Wong et al. | 623/4 |
| 5,824,072 A | 10/1998 | Wong | 623/4 |
| 5,869,079 A | 2/1999 | Wong et al. | 424/426 |
| 5,980,945 A | 11/1999 | Ruiz | 424/484 |
| 5,980,948 A | 11/1999 | Goedemoed et al. | 424/489 |
| 6,001,386 A | 12/1999 | Ashton et al. | 424/423 |
| 6,007,843 A | 12/1999 | Drizen et al. | 424/488 |
| 6,011,011 A | 1/2000 | Hageman | 514/12 |
| 6,278,882 B1 * | 8/2001 | Choi | 455/453 |
| 6,312,708 B1 | 11/2001 | Donovan | 424/423 |
| 6,383,509 B1 | 5/2002 | Donovan et al. | 424/423 |
| 6,692,759 B1 | 2/2004 | Wong et al. | 424/423 |
| 2004/0247645 A1 | 12/2004 | Wong et al. | 424/426 |
| 2005/0048099 A1 | 3/2005 | Shiah et al. | 424/428 |
| 2005/0198538 A1 * | 9/2005 | Soltis et al. | 713/300 |
| 2005/0203542 A1 | 9/2005 | Weber et al. | 606/107 |
| 2006/0073182 A1 | 4/2006 | Wong et al. | 424/426 |

\* cited by examiner

*Primary Examiner*—Huy Phan
*Assistant Examiner*—Julio Perez

(57) ABSTRACT

A system and method for allocating vocoder resources for interconnect calls includes consideration of what percentage of interconnect calls have been assigned to a particular vocoder type. In an embodiment a vocoder type is assigned to a given interconnect call based on a comparison of the available capacity of the telecommunications network to one or more threshold values, and a determination on whether or not the percentage of interconnect calls assigned to a given vocoder type has exceeded a threshold percentage. In certain embodiments, the vocoder is adapted to operate in one of at least two possible types, where the first type is characterized by a higher voice quality, but a lower network capacity, than the second type.

29 Claims, 5 Drawing Sheets

SYSTEM AND METHOD FOR PARTIALLY COUNT-BASED ALLOCATION OF VOCODER RESOURCES

FIELD OF THE INVENTION

The present invention relates generally to the field of telecommunications, and in particular, to improving the management and allocation of voice encoder/decoder (vocoder) resources.

BACKGROUND OF THE INVENTION

In providing cellular telephone services, telecommunications providers are generally interested in providing the highest quality of service while still maximizing the capacity of the network. Sometimes these are competing objectives. With respect to network capacity, cellular network operators desire to maximize network system capacity. Higher network capacity results in less rejections of call requests and, in-turn, increased customer satisfaction. Therefore, it is desirable to increase network capacity.

In providing the highest quality of service, high rate voice coding or vocoding is the technology behind most modern voice compression techniques and has been utilized to improve voice quality for cellular calls. As is known, a vocoder converts the spoken words of the caller into a digital signal and then reconverts the signal into an audible sound so that the words can be heard by the intended recipient. These high rate vocoders provide good voice quality however, in general, these high coding/decoding rates utilize more network capacity than lower rate vocoders.

A vocoder is typically a computer algorithm or program which operates on a digitized voice signal generated by an Analog-to-Digital converter. The vocoder algorithm first encodes a voice signal by processing it in varying ways in order to represent it with some small number of bits. A vocoder also contains a decoding function which is able to reconstruct the voice waveform from these bits. Many different vocoder algorithms have been developed which employ different types of processing and depending on the method of processing, some algorithms perform considerable better or worse than others. Vocoder performance is generally measured in terms of compression rate (i.e. how few bits are required to represent the voice signal) plus the voice quality (i.e. how much distortion does the encoding/decoding process introduce into the reconstructed voice signal). Additional performance factors include the complexity of the algorithm, in terms of the amount of computing power required to run the algorithm, and its robustness to factors such as background noise and bit errors which are often present in the real world. Due to these differences, selection of the best vocoder is one of the larger challenges faced by the network designer.

One relatively new vocoding method is the AMBE® Vocoder developed by Digital Voice System, Inc. of Burlington, Mass. The AMBE® class of vocoders require roughly half the bandwidth of earlier vocoders, such as the Vector Sum Excited Linear Prediction (VSELP) method. Moreover, these modern vocoders have the ability to interleave several calls onto a single channel at a given frequency. Such vocoders can also be operated to interleave more or fewer calls onto a given channel, depending on the available bandwidth and desired call quality. For example, such vocoders have the ability to be assigned to a call as a so-called full 3:1 call or a split 3:1 call, where a full 3:1 call will be interleaved with two other calls onto a single channel and a split 3:1 call will be interleaved with five other calls for a total of six call on a single channel. There is, however, a trade off in that the more calls that are interleaved onto a channel, the lower the call quality will be. That is, increasing network capacity to handle additional calls by implementing split 3:1 encoding tends to result in a corresponding decrease in call quality. The problem lies in identifying the optimum conditions under which split 3:1 encoding should be used so as to maintain as high a call quality as possible, while providing increased network capacity as needed. Determining these conditions has proved to be a difficult task. Thus, despite the recent advancements in vocoding technology, there is still a need for optimizing vocoder resource allocation.

SUMMARY OF THE INVENTION

A system and method for allocation of vocoder resources is disclosed herein. In an embodiment, a method of the invention includes receiving a request to transport the interconnect call, determining if an available network capacity of the telecommunications network is greater than a threshold value, and determining whether a threshold percentage of calls assigned to a particular vocoder type has been reached. One embodiment of the method further includes assigning at least one of a first vocoder type and a second vocoder type to the interconnect call based on whether the available network capacity is greater than the threshold value and on whether the threshold percentage has been reached.

Other aspects, features, and techniques of the invention will be apparent to one skilled in the relevant art in view of the following detailed description of the invention.

DETAILED DESCRIPTION OF THE EXEMPLARY EMBODIMENTS

Systems and method for allocating vocoder resources are disclosed. One aspect of the invention is to assign a vocoder type to an interconnect call transported over a telecommunications network. In certain embodiments, the vocoder type to be assigned is based on i) a comparison of the available capacity of the telecommunications network to one or more threshold values, and ii) whether the percentage of calls assigned to a particular vocoder type exceeds a predetermined threshold. In certain embodiments, the vocoder selection is adapted to choose one of at least two possible types, where the first type is characterized by a higher voice quality, but a lower network capacity, than the second type.

In one or more embodiments, the higher voice quality vocoder type may be assigned to an interconnect call when the available network capacity is greater than the threshold value(s). In certain circumstances, the higher voice quality type may be assigned to the interconnect call even if the available network capacity is not greater than the threshold value(s), such as for example when the percentage of interconnect calls assigned to a particular vocoder type exceeds the predetermined threshold. Alternatively, if the available network capacity is not greater than the threshold capacity, and the percentage of calls assigned to a particular vocoder type does not exceed the predetermined threshold, then the second vocoder type may be assigned to the interconnect call.

In certain embodiments, the second vocoder type may be associated with interleaving a higher number of voice calls onto a single radio frequency channel of the telecommunications network than with the first vocoder type. For example, the second vocoder type may be associated with interleaving six calls onto a single radio frequency channel, while the first vocoder type may involve interleaving only three call onto a single channel.

In certain additional embodiment, the available network capacity of a telecommunications network may be compared to a threshold value which is comprised of at least one of a congestion relief threshold and a split threshold. In certain embodiments, the congestion relief threshold may be indicative of how readily congestion relief measures are to be undertaken by the telecommunications network, while the split threshold may be indicative of how readily the second vocoder type is to be assigned to the interconnect call in question. In one embodiment, the threshold value may be based on the sum of the congestion relief threshold and the split threshold.

Figure 1:
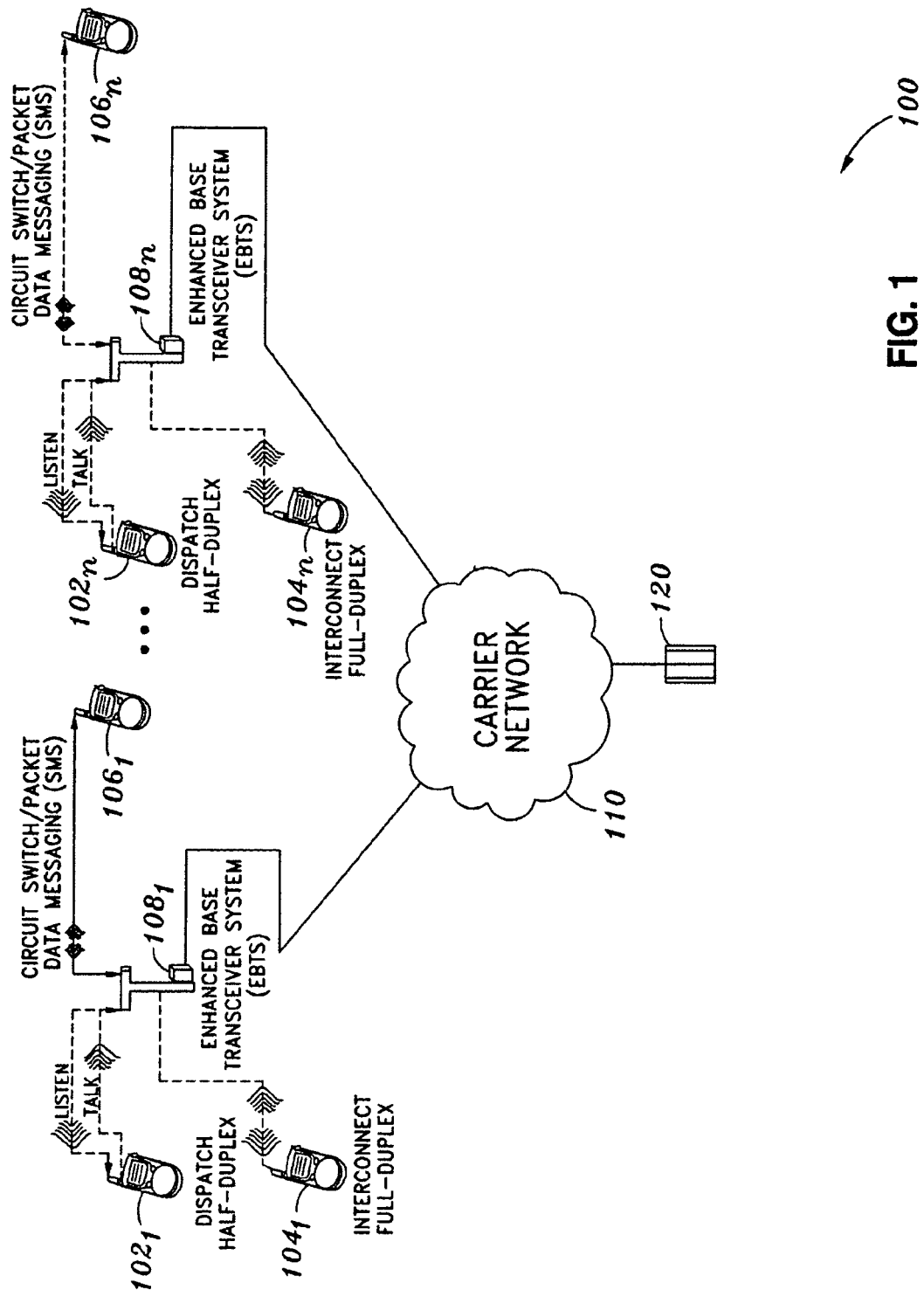
FIG. 1 illustrates an embodiment of a communication system capable of implementing one or more aspects of the invention.

Referring now to the figures, FIG. 1 illustrates a block diagram of an exemplary telecommunications communication system 100 in which one or more aspects of the invention may be implemented. In certain embodiments, the communication system 100 is an iDEN system, such as the iDEN network owned and operated by Nextel Communications Inc. of Reston, Va. However, the telecommunication network of FIG. 1 may similarly be a Global System for Mobile (GSM) network, Code Division Multiple Access (CDMA) network, a Time Division Multiple Access (TDMA) network, or a Public Switched Telephone Network (PSTN). As shown in FIG. 1, the communication system 100 may serve a plurality of dispatch subscriber units $102_1$-$102_n$, a plurality of interconnect subscriber units $104_1$-$104_n$, and a plurality of SMS subscriber units $106_1$-$106_n$ (collectively, "subscriber units 102-106"), all of which may communicate with a plurality of local base stations $108_1$-$108_n$. While the embodiment described herein is an iDEN network, it is readily understood that other known networks may be used; such as CDMA, GSM, etc. The subscriber units are the end-user interface to the communication network 100. It should be appreciated that subscriber units 102-106 may be comprised of phones, pagers, modems, mobile transceivers, personal digital assistants, end-user base transceivers, or similar devices capable of communicating over the carrier network 110. Subscriber units 102-106 may be capable of dispatch calling, interconnect calling, roaming, message mail and/or data communications. Said subscribers may preferably be capable of using multiple vocoding/encoding types.

Base stations $108_1$-$108_n$ may be comprised of base station radios and control equipment contained in an Enhanced Base Transceiver System (EBTS), or cell site. Such cell sites may be used to provide the RF link between the carrier network 110 and the various subscriber units 102-106. Cell sites may further provide connectively between subscriber units 102-106 and an external network 112.

Figure 2:
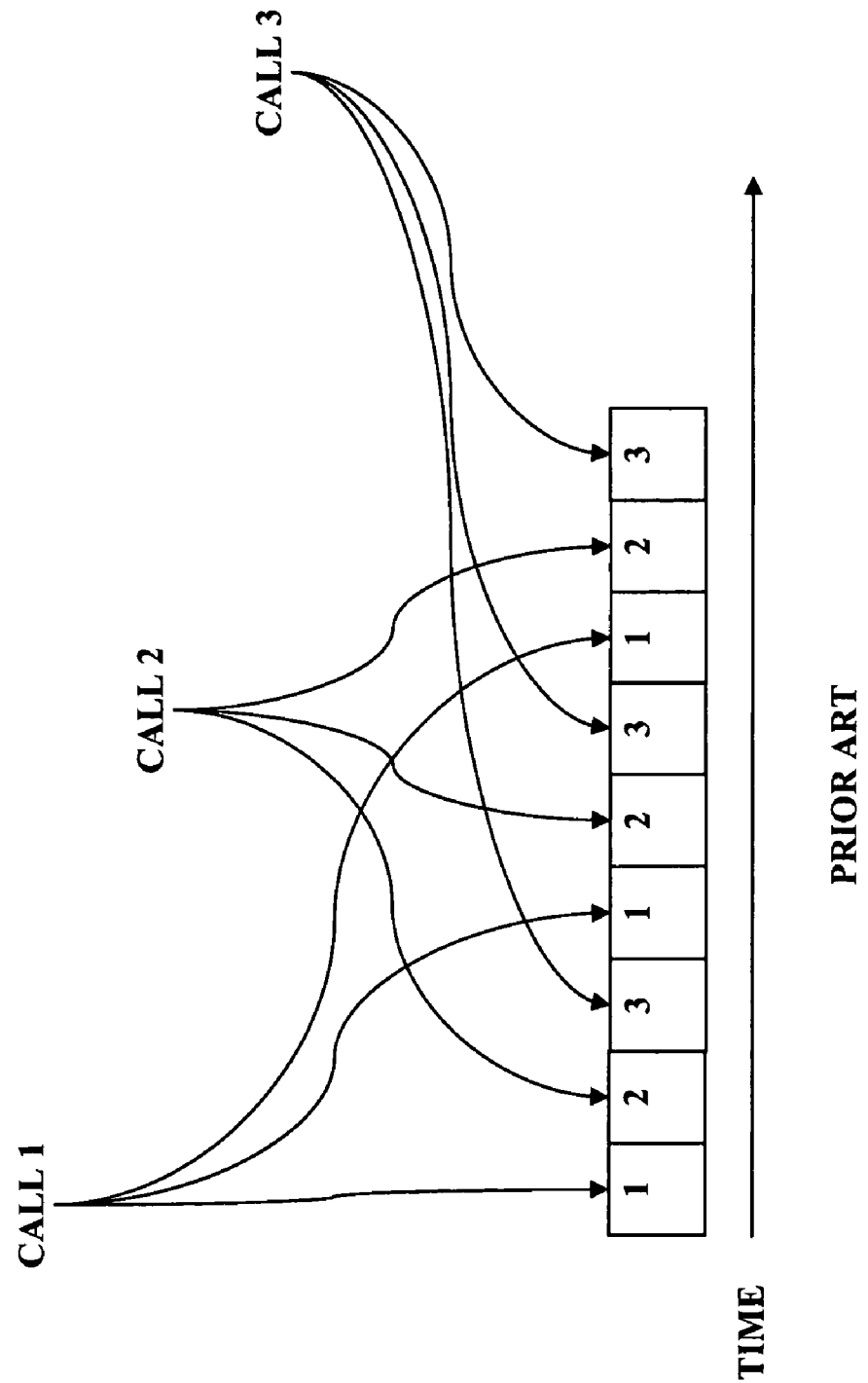
FIG. 2 illustrates an interleaved communication channel of the prior art.

Wireless communication between base stations $108_1$-$108_n$ and subscriber units 102-106 occurs via encoded radio frequency (RF) channels which provide physical paths over which digital communication signals such as voice and data are transmitted. As is generally known in the art, communication channels between the base stations $108_1$-$108_n$ and subscriber units 102-106 may be encoded by a transcoder using a vocoder algorithm (e.g., AMBE®, VSELP, etc.). Vocoders generally operate by modeling a segment (or frame) of the speech waveform on the order of 15-20 ms. The speech model parameters are estimated, quantized, coded, and transmitted over the communication channel. At the receiver, the transmitted values are decoded, reconstructed, and used to synthesize speech. To increase network capacity, vocoders have the ability to encode data from several callers onto the same channel frequency. For example, a vocoders can interleave calls from either 3 or 6 users onto a single channel whereby each user transmits and receives only during an assigned time slot interval. To that end, FIG. 2 depicts a typical exemplary interconnect channel comprised of 9 time slots spanning 15-20 ms. Three different callers each have been assigned a unique time slot designation. This vocoder type is typically referred to as full 3:1 service—meaning that a user is allocated every third time slot on a single frequency channel, thereby interleaving caller time slots for a given channel and increasing channel capacity. While FIG. 2 depicts 9 time slots, interconnect channels in iDEN networks may be comprised of 6 time slots.

Figure 3:
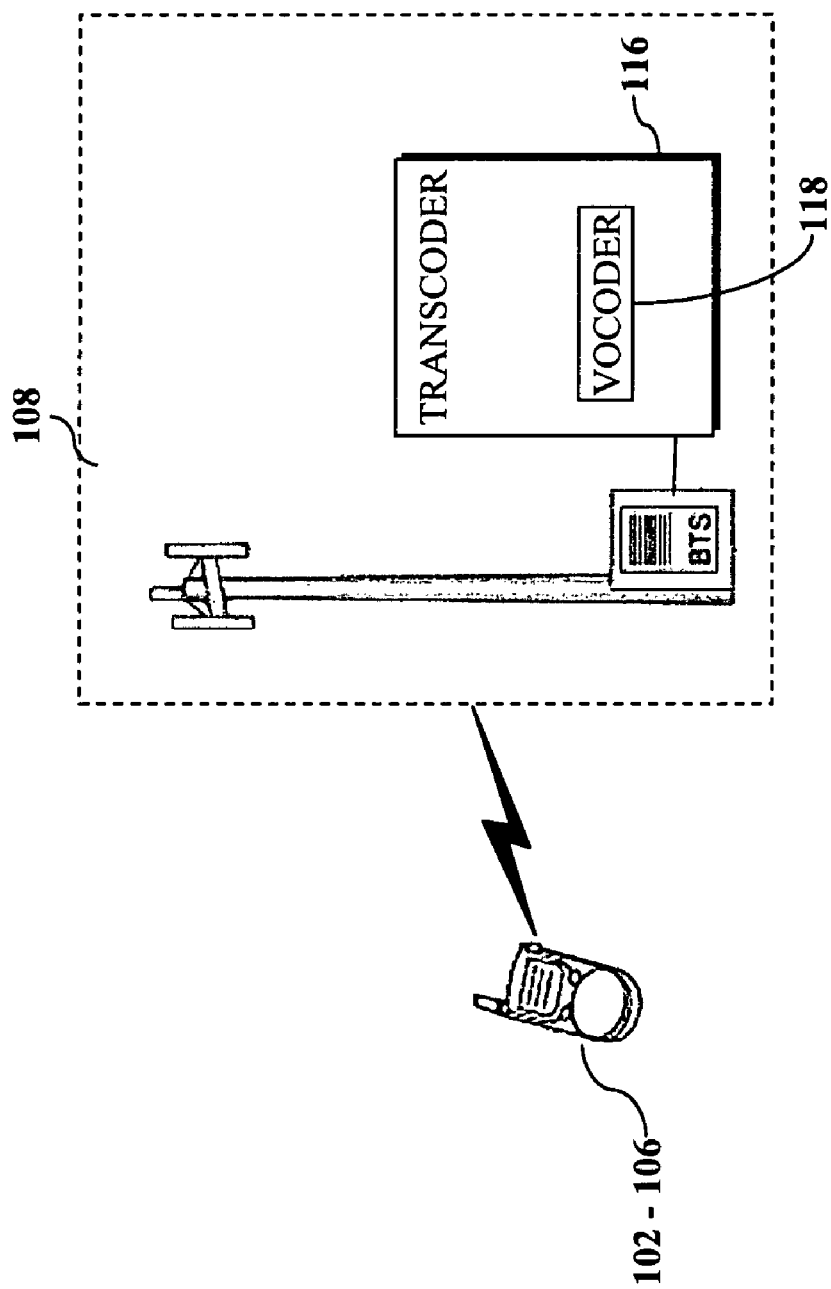
FIG. 3 illustrates one embodiment of a base station in communication with a subscriber unit in accordance with the principles of the present invention

FIG. 3 illustrates a simplified representation of the interaction between a base station 108 and a subscriber unit 102-106 in accordance with the principles of the invention. In this embodiment, the base station is shown as being in communication with a transcoder 116. It should be appreciated that the transcoder 116 may be located locally to the base station 108 or remotely. For example, it should be appreciated that the transcoder 116 may be part of a central office that is in communication with a plurality of base stations $108_1$-$108_n$. The transcoder 116 includes a vocoder module 118 which encodes/decodes voice data sent to and from the base station 108 over one or more available RF channels. In certain embodiments, the base station 108 will separate the voice data into a predetermined number of time slots where the predetermined number of time slots is based on the current encoding type of the vocoder module 118. In certain embodiments, vocoder 118 may allocate channel slots on either a full 3:1 vocoding type or a split 3:1 vocoding type, where split 3:1 type allows six callers to share a single channel rather than just three callers as in the case of the full 3:1 type depicted in FIG. 2.

While operating in the split 3:1 type increases network capacity, there is a corresponding decrease in call quality. Thus, the decision whether to operate in full or split 3:1 type by a base station's vocoder allocation manager may be made by comparing available resources to one or more threshold parameters. Currently, each time there is a new interconnect call, the allocation of vocoder resources is determined by comparing a value representative of the available bandwidth ("available_ic_capacity") to the sum of a congestion relief threshold ("crThreshold") and a split threshold ("SplitThreshold"). If the available_ic_capacity is less than or equal to the sum of the SplitThreshold plus the crThreshold, then the vocoder type becomes the split 3:1 type in which an RF channel can be shared by up to six callers. Otherwise, full 3:1 type may be used.

The available_ic_capacity value typically represents the networks capacity on a market basis, local network basis, cell site, etc. The crThreshold value is used to determine how soon congestion relief call offloading will commence. That is, the higher the crThreshold value, the sooner congestion relief measures will begin. The crThreshold value is based on numerous market-level factors that are beyond the scope of this disclosure. Similarly, the SplitThreshold value involves consideration of a multitude of factors, including average call blocking, number of available carriers, customer satisfaction rates, etc. Ultimately, the SplitThreshold value is a representation of how quickly calls should be allocated to split 3:1 service. That is, the higher the SplitThreshold value, the more calls that will be split 3:1 calls. Similarly, the higher the crThreshold value, the greater the amount of calls that will be offloaded from a network resource, such as an EBTS, and the more calls that will be allocated as split 3:1 calls.

Figure 4:
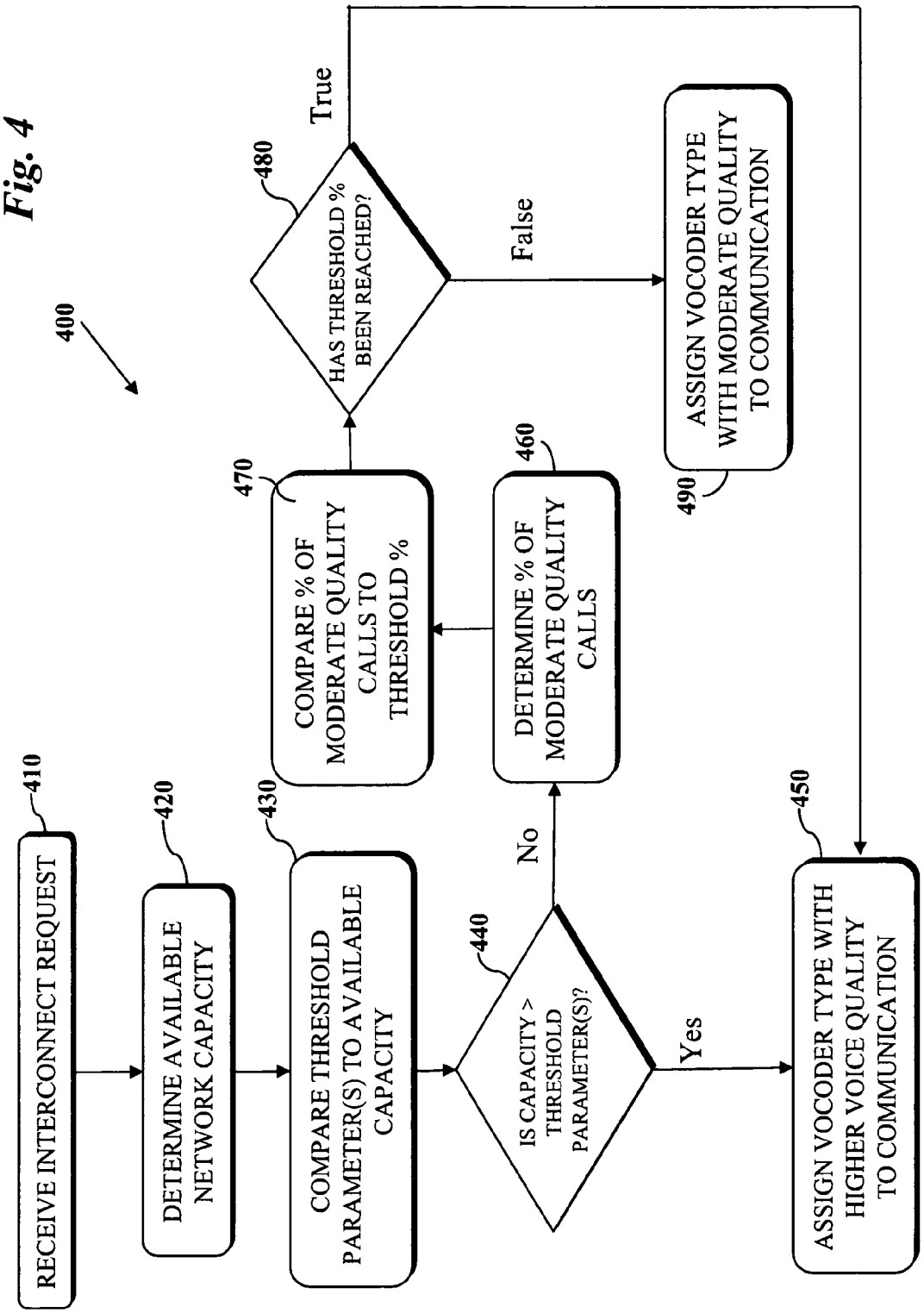
FIG. 4 illustrates one embodiment of a process for carrying out certain aspects of the invention.

While the aforementioned approach improves vocoder resource management, solely comparing crThreshold values and SplitThreshold values to the available_ic_capacity value may lead to inconsistent management of calls across base station cells. This is due to the fact that localized conditions cannot be taken into account when these parameters are set at the global market level from the Operation and Maintenance Center (OMC), as they typically are. That is, the SplitThreshold and crThreshold parameters are typically determined by balancing a multitude of factors each of which may or may be applicable to a given cell site. Alternatively, setting the vocoder type parameters on the basis of specific cell sites would represent a daunting task requiring a large of amount of resources. The end result is that even optimized threshold values can lead to unnecessarily poor voice quality during high capacity/low usage times. Thus, one aspect of the invention is to improve the allocation of vocoder resources by also taking into account the percentage of calls handled by the network which have been allocated to a particular vocoder type. To that end, FIG. 4 illustrates one embodiment of a process for allocating vocoder resources in accordance with the principles of the invention.

Process 400 begins at block 410 where an interconnect request is received from a user (e.g., subscriber unit 102-106) by a cell tower (e.g., base station 108). A determination may then be made as to what the available network capacity is for that network resource (i.e., cell tower), where the capacity may be represented as a value (e.g., available_ic_capacity) indicative of the cell tower's available RF bandwidth. At block 430, the capacity then may be compared to one or more threshold parameters. In certain embodiments, such parameter(s) may include a congestion relief threshold (e.g., crThreshold) and/or a split threshold value (e.g., SplitThreshold), where the congestion relief threshold governs how quickly congestion control measures are taken, and the split threshold value governs how quickly calls are allocated as split 3:1 calls. In certain other embodiments, the one or more threshold parameters may simply be representative of how quickly a vocoder (e.g., vocoder 118) enters a higher capacity type characterized by moderate voice quality rather than operating in a lower capacity type characterized by higher voice quality.

Once the comparison of block 430 is done, a determination may then be made at block 440 as to whether the available capacity is greater than the threshold parameter(s). If the available capacity is greater than the threshold parameter(s), then the vocoder type for the incoming interconnect call may be assigned to the higher quality type at block 450 (e.g., full 3:1 type). If, on the other hand, the available capacity is less than or equal to the threshold parameter(s) then process 400 will continue to block 460 where a determination is made as to what percentage of the total interconnect calls have been assigned to the moderate quality vocoder type. In another embodiment, an available capacity that is equal to the threshold parameter(s) may still cause the process to move to block 450 and assign the incoming call to the higher voice quality.

At block 460, the percentage of the total interconnect calls that have been assigned to the moderate quality vocoder type is determined. In one embodiment, this percentage represents the percentage of total active calls on a given cell tower that have been assigned the moderate quality vocoder type. In one embodiment, this percentage may be updated each time an interconnect call begins, ends or is offloaded by a given cell tower. Alternatively, this percentage may be updated on a less frequent basis. Additionally, the percentage of moderate quality vocoder type may be based on a number of interconnect calls other than the total calls being handled by a given cell tower. It should equally be appreciated that numerous other approaches may be used to determine the percentage of moderate quality calls to the total call received, and the present invention is not limited to how the number of moderate quality calls are determined or designated.

Continuing to refer to FIG. 4, once the percentage of calls allocated to the moderate quality vocoder type has been determined, process 400 will move to block 470 where this percentage is compared against a threshold percentage. In one embodiment, the threshold percentage may be set globally, at the urban level, at the market level or at the cell level. Regardless, the threshold percentage may be a fixed value set by a network operator, or may be a dynamic value that changes based on one or more factors (e.g., time of day).

At block 480, process 400 may then determine if the threshold percentage has in fact been reached. If not, then process 400 may continue to block 490 where the incoming interconnect call is again assigned to the moderate voice quality vocoder type. If the threshold percentage has been reached, however, then process 400 may move to block 450 where the vocoder type for the incoming interconnect call is assigned to the higher quality type. In this fashion, better voice quality may be achieved for a greater percentage of incoming calls where resources otherwise permit.

Figure 5:
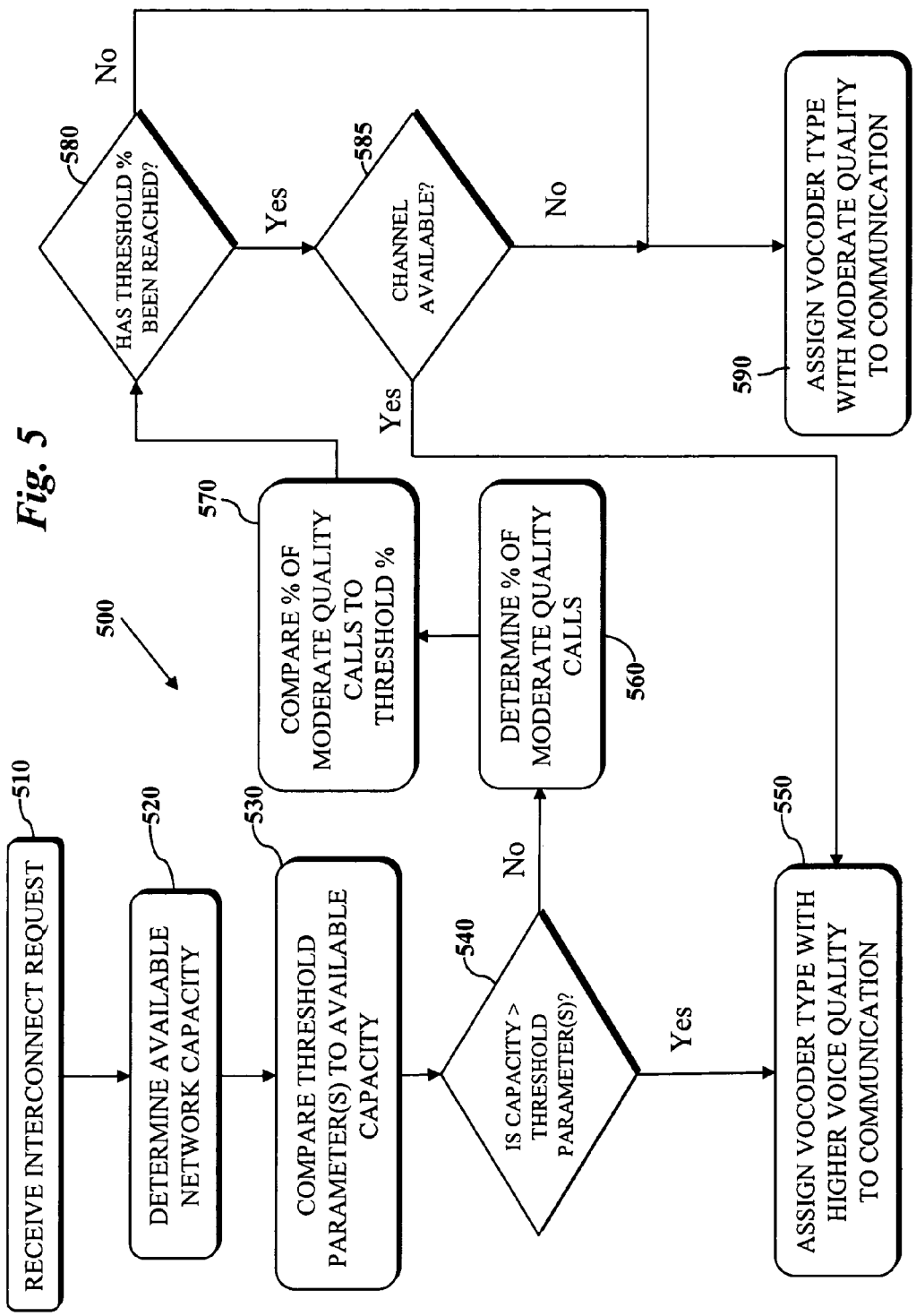
FIG. 5 illustrates another embodiment of a process for carrying out certain aspects of the invention.

However, it is possible that even when the threshold percentage has been met, there may not be an available channel for the incoming interconnect call. For such cases, the process 500 of FIG. 5 may be used. In particular, process 500 begins at block 510 where an interconnect request is received from a user by a cell tower, as with the process 400 of FIG. 4. Once the available network capacity is determined at block 520, it can be compared to the one or more threshold parameters at block 530, just as in the embodiment of FIG. 4. If it is determined at block 540 that the available capacity is still greater than the threshold parameter(s), then the vocoder type for the incoming interconnect call will be assigned to a higher quality type at block 550. If, on the other hand, the available capacity is less than or equal to the threshold parameter(s), then process 500 will continue to block 560 where a determination is made as to what percentage of the total interconnect calls have been assigned to the moderate quality vocoder type. Once the percentage of calls allocated to the moderate quality vocoder type has been determined, process 500 will move to block 570 where this percentage is compared against the previously-discussed threshold percentage.

At block 580, process 500 may then determine if the threshold percentage has in fact been reached. If not, then process 500 may continue to block 590 where the incoming interconnect call is again assigned to the moderate voice quality vocoder type. If the threshold percentage has been reached, however, then process 500 may move to block 585 where a further determination can be made as to whether there are any available channels to handle the incoming request. If so, then process 500 will continue to block 550 where the vocoder type will be assigned to the higher quality type. If there are no available channels, the process 500 moves to block 590 where the vocoder type is assigned to the moderate quality type. It should further be appreciated that other measures may be undertaken to accommodate the new interconnect request when there are no available channels (e.g., congestion control offloading). While the present disclosure has been principally directed to describing two vocoder types, it should equally be appreciated that the invention may be implemented using more than two vocoder types.

The disclosed embodiments are illustrative of the various ways in which the present invention may be practiced. Other embodiments can be implemented by those skilled in the art without departing from the spirit and scope of the present invention. For example, while the processes of FIGS. 4-5 have been described in the above embodiments, the order of one or more of the acts depicted in FIGS. 4-5 may be changed while still conforming to the principles of the invention. For the sake of simplicity, the processes of FIGS. 4-5 have been defined in general steps and it should be appreciated that other steps consistent with the principles of the invention may be included.

What is claimed is:

1. A method for assigning a vocoder type to an interconnect call transported over a telecommunications network, comprising the acts of:
   receiving a request to transport the interconnect call;
   determining if an available network capacity of the telecommunications network is greater than a threshold value;
   determining whether a desired threshold percentage of calls assigned to a particular vocoder type has been reached, wherein the desired threshold percentage is based on a total number of active calls of a cell of the telecommunications network; and
   assigning at least one of a first vocoder type and a second vocoder type to the interconnect call based on whether the available network capacity is greater than the threshold value and on whether the desired threshold percentage has been reached, wherein said first vocoder type provides a higher voice quality for the interconnect call than the second vocoder type.

2. The method of claim 1 wherein if the available network capacity is greater than the threshold value, the first vocoder type is assigned to the interconnect call.

3. The method of claim 1 wherein if the available network capacity is not greater than the threshold value, and the desired threshold percentage has been reached, the first vocoder type is assigned to the interconnect call.

4. The method of claim 3 wherein said first vocoder type is assigned to the interconnect call only if there is an available channel of said telecommunications network.

5. The method of claim 1 wherein if the available network capacity is not greater than the threshold value, and the desired threshold percentage has not been reached, the second vocoder type is assigned to the interconnect call.

6. The method of claim 1 wherein said second vocoder type is associated with interleaving a higher number of voice calls onto a single radio frequency channel of the telecommunications network, and said first vocoder type is associated with interleaving a lower number of voice calls onto the single radio frequency channel.

7. The method of claim 6 wherein said higher number of voice calls is six and said lower number of voice calls is three.

8. The method of claim 1 wherein said threshold value comprises at least one of a congestion relief threshold and a split threshold, wherein said congestion relief threshold is indicative of how readily congestion relief measures are to be undertaken by the telecommunications network, and said split threshold is indicative of how readily said second vocoder type is to be assigned.

9. The method of claim 8 wherein said threshold value is based on the sum of the congestion relief threshold and the split threshold.

10. A system for increasing capacity in a telecommunications network, comprising:
    a vocoder adapted to operate in one of at least a first vocoder type and a second vocoder type based on whether an available network capacity of the telecommunications network is greater than a threshold value, and on whether a desired threshold percentage of calls assigned to a particular vocoder type has been reached, wherein the first vocoder type provides a higher voice quality for an interconnect call than the second vocoder type, and wherein the threshold value comprises at least one of a congestion relief threshold and a split threshold, wherein said congestion relief threshold is indicative of how readily congestion relief measures are to be undertaken by the telecommunications network, and said split threshold is indicative of how readily said second vocoder type is to be assigned.

11. The system of claim 10 wherein if the available network capacity is greater than the threshold value, the first vocoder type is assigned to the interconnect call.

12. The system of claim 10 wherein if the available network capacity is not greater than the threshold value, and the desired threshold percentage has been reached, the first vocoder type is assigned to the interconnect call.

13. The system of claim 12 wherein said first vocoder type is assigned to the interconnect call only if there is an available channel of said telecommunications network.

14. The system of claim 10 wherein if the available network capacity is not greater than the threshold value, and the desired threshold percentage has not been reached, the second vocoder type is assigned to the interconnect call.

15. The system of claim 10 wherein said second vocoder type is associated with interleaving a higher number of voice calls onto a single radio frequency channel of the telecommunications network, and said first vocoder type is associated with interleaving a lower number of voice calls onto the single radio frequency channel.

16. The system of claim 15 wherein said higher number of voice calls is six and said lower number of voice calls is three.

17. The system of claim 10 wherein the desired threshold percentage of calls assigned to the second vocoder type is based on a total number of active calls of a cell of the telecommunications network.

18. The system of claim 10 wherein said threshold value is based on the sum of the congestion relief threshold and the split threshold.

19. A method comprising the acts of:
    comparing an available network capacity of the telecommunications network to a threshold value;
    determining if a desired threshold percentage of calls assigned to a particular vocoder type has been reached; and
    selecting one of at least a first vocoder type and a second vocoder type based on said comparing and said determining, wherein said first vocoder type provides a higher voice quality and lower network capacity than the second vocoder type, and wherein the threshold value comprises at least one of a congestion relief threshold and a split threshold, wherein said congestion relief threshold is indicative of how readily congestion relief measures are to be undertaken by the telecommunications network, and said split threshold is indicative of how readily said second vocoder type is to be selected.

20. The method of claim 19 wherein if the available network capacity is greater than the threshold value, the first vocoder type is selected.

21. The method of claim 19 wherein if the available network capacity is less than the threshold value, and the desired threshold percentage has been reached, the first vocoder type is selected.

22. The method of claim 21 wherein said first vocoder type is selected only if there is an available channel of said telecommunications network.

23. The method of claim 19 wherein if the available network capacity is less than the threshold value, and the desired threshold percentage has not been reached, the second vocoder type is selected.

24. The method of claim 19 wherein if the available network capacity is equal to the threshold value, said selecting comprises selected the first vocoder type if the desired threshold percentage has been reached and selecting the second vocoder type if the desired threshold percentage has not been reached.

25. The method of claim 19 wherein if the available network capacity is equal to the threshold value, said selecting comprises selecting the first vocoder type.

26. The method of claim 19 wherein said second vocoder type is associated with interleaving a higher number of voice calls onto a single radio frequency channel of the telecommunications network, and said first vocoder type is associated with interleaving a lower number of voice calls onto the single radio frequency channel.

27. The method of claim 26 wherein said higher number of voice calls is six and said lower number of voice calls is three.

28. The method of claim 19 wherein said threshold value is based on the sum of the congestion relief threshold and the split threshold.

29. The method of claim 19 wherein determining if the desired threshold percentage of calls has been reached comprises determining whether the desired threshold percentage of calls assigned to the second vocoder type has been reached where the desired threshold percentage is based on a total number of active calls of a cell of the telecommunications network.

* * * * *